3,064,467
SEALING HEAD FOR HYDROSTATIC PIPE-TESTING APPARATUS
Peter Kortenhoven, Chicago, Ill., assignor to United States Steel Corporation, a corporation of New Jersey
Filed Dec. 9, 1959, Ser. No. 858,388
1 Claim. (Cl. 73—49.6)

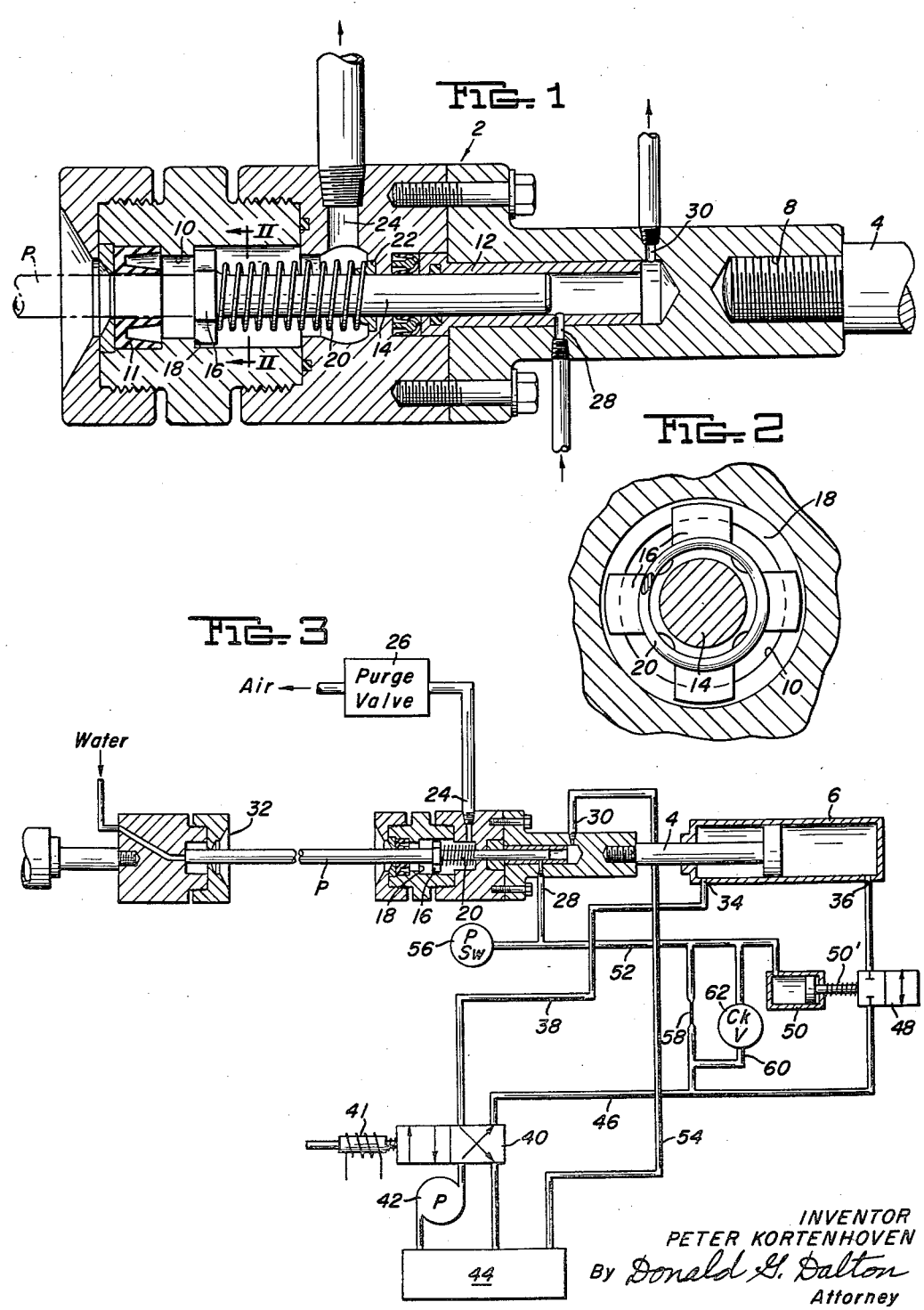
Nov. 20, 1962 — P. KORTENHOVEN — 3,064,467
SEALING HEAD FOR HYDROSTATIC PIPE-TESTING APPARATUS
Filed Dec. 9, 1959
INVENTOR
PETER KORTENHOVEN
By Donald G. Dalton
Attorney United States Patent Office 3,064,467
Patented Nov. 20, 1962

The present invention relates generally to apparatus for testing pipe and other tubular objects under hydrostatic pressure and more particularly to an improved test sealing head for such apparatus.

Prior to my invention conventional hydrostatic test benches were usually equipped with an electric motor-driven screw type set-out test head, the travel of which was controlled by a limit switch which sensed the end of the tube and originated the signal to stop the travel of the test head. Some test benches were built which utilized a hydraulically powered set-out mechanism for moving the test head and these were controlled by an electric switch or photoelectric cell. An example of such hydraulically powered apparatus is described in United States Patent No. 2,671,338 issued to Reichl.

The mechanisms described above were not completely satisfactory for various reasons, principally as follows:

(1) The maintenance of the limit switch or photoelectric cell, motor, brake, and screw of such apparatus was excessive.

(2) A change in the diameter of the pipe or tube being tested affected the operation of the limit switch.

(3) The unavoidable presence of water, frequently murky, in the vicinity detrimentally affected the functioning of the photoelectric cell.

(4) The speed of travel of the test head was limited by practical limits in the design of the feed screw element of such mechanisms.

It is, accordingly, the primary object of my invention to eliminate the foregoing difficulties by providing an improved test head which is hydraulically powered and hydraulically controlled.

It is another object of my invention to provide an improved test head as set forth immediately above having a valve cylinder therein and a valve piston in the cylinder adapted to be engaged by a pipe end and shifted in position, the hydraulic control means being operated by the shifting of the valve piston.

These and other objects will become more apparent after referring to the following specification and attached drawings, in which:

FIGURE 1 is a longitudinal sectional view of the test head of the invention;

FIGURE 2 is a cross-sectional view taken along the line II—II of FIGURE 1; and

FIGURE 3 is a diagrammatic illustration showing the test head of the invention in the hydraulic system of a hydrostatic testing bench.

Referring in detail to the drawing, reference numeral 2 designates generally the test head of the invention which is adapted to be threadingly connected with the piston rod 4 of a setting-out cylinder 6 of a test bench (not shown) by means of an internally threaded socket 8 formed in one end of the test head 2. The opposite end of the head 2 is provided with an axial bore 10 having a flared entrance end for receiving the end of a pipe length P aligned therewith. A suitable gasket 11 of flexible material is disposed in the bore 10 adjacent its flared entrance end for providing a seal around the end of pipe length P received therein. A valve cylinder 12 is axially spaced from and aligned with the bore 10 inside the head 2. A valve piston 14 is slidably disposed in the valve cylinder with a portion thereof projecting into the bore 10. The projecting portion of the valve piston is provided with an enlarged, fluted head 16 which is normally urged against a shoulder 18 in the bore 10 by means of a helical spring 20 which is circumferentially disposed around the projecting portion of the valve piston with one end bearing against the head 16 and the other end against a shoulder 22 at the inner end of the bore 10.

An exhaust port 24 extends from the bore 10 through the wall of the test head 2 and is connected with a purge valve 26. A pressure port 28 is provided in the wall of the valve cylinder 12 intermediate its ends. An exhaust port 30 extends from the cylinder adjacent its inner end.

Referring now more particularly to FIGURE 3, reference numeral 32 designates the fixed-travel test head at the water end of a hydrostatic testing bench. The head 32 is in a housing which is normally adapted to move toward and away from one end of the pipe P in conjunction with the test head 2 of the invention in a manner well known in the art.

The setting-out cylinder 6 with which the test head 2 is connected is double-acting having a port 34 adjacent one end and a port 36 adjacent its other end. Port 34 is connected with a hydraulic system which includes a line 38 extending from a valve 40 which in turn is connected with a pump 42 which pumps pressure fluid from a reservoir tank 44. The valve 40 is operated by a solenoid 41. A second line 46 extends from the valve 40 to the port 36. A valve 48 operated by a spring-return hydraulic pilot valve 50 is provided in the line 46 between the valve 40 and the port 36.

The test head 2 of the invention is connected with the hydraulic system just described by means of a pilot line 52 which normally provides flow of hydraulic pressure fluid from the line 46 into pressure port 28, through the valve cylinder 12, out of the exhaust port 30, into a line 54 and thence back into the reservoir tank 44. The pilot line 52 also supplies pressure fluid to the hydraulic pilot valve 50 and is also connected with a pressure switch 56 which functions to initiate the hydrostatic pressure test after the ends of the pipe P have been properly sealed by the test heads.

In operation, the pipe P is clamped in position between and aligned with test heads 32 and 2 and the heads are moved into position on the ends of the pipe length to seal the same as shown in FIGURE 3. It is common practice to line up the pipe with its end toward the head 32 at a fixed predetermined distance from the head 32 so that the distance traveled by the head 32 to seal the end of the pipe is the same for all lengths of pipe. Conventional means are provided for bringing about the fixed travel of the head 32. Since the pipe does vary in length, the test head 2 of the apparatus must be moved by independent means. Such movement is provided by the setting-out cylinder 6.

To move test head 2 into sealing engagement with the end of pipe P, the solenoid 41 is actuated to shift the valve 40 and permit pressure fluid to flow into port 36 of the setting-out cylinder. This causes movement of the piston of the cylinder to project piston rod 4 and thereby move the test head 2 toward the end of the pipe. At the same time fluid is caused to flow through the pilot line 52 from line 46 through the valve cylinder 12 and out of exhaust port 30.

When the pipe end engages the head 16 of the valve piston 14, the valve piston is moved inwardly of the valve cylinder against the pressure of spring 20 until the pressure port 28 is blocked by the valve piston as shown in FIGURE 3. FIGURE 3 illustrates the hydraulic system after the pipe P has engaged the head 16 of the valve piston 14 and shifted the latter into position blocking pressure port 28. Blocking of port 28 causes pressure to build up in the pilot line 52 which pressure actuates the hydraulic pilot valve 50 to shift valve 48 into position blocking the flow of pressure fluid through line 46. When this occurs the piston of the setting-out cylinder 6 is rendered immobile and further movement of test head 2 is stopped. At the same time the pressure in the pilot line 52 actuates pressure switch 56 to initiate the testing cycle. At the start of the testing cycle water flows from head 32, through the pipe P, through bore 10 of body 2, and out of the exhaust port 24 to purge all air out of the pipe and the bore 10. The head 16 of piston 14 is fluted to permit passage of the air and water. When the purge is complete valve 26 closes automatically by suitable means (not shown) to block port 24 and the test is carried on to completion.

On completion of the test cycle, the solenoid 41 of valve 40 is again actuated to shift the valve so that fluid is introduced to port 34 of cylinder 6 and line 46 is put on exhaust. When line 46 is thus put on exhaust the pressure in the pilot line is relieved and hydraulic pilot valve 50 is shifted by the spring 50' associated therewith to shift valve 48 so that fluid is exhausted through port 36 as the piston of cylinder 6 is retracted under pressure of the fluid entering port 34. As the piston of cylinder 6 retracts it moves test head 2 out of engagement with the end of pipe P and this permits valve piston 14 to be moved to ready position under pressure of spring 20.

If desired, an orifice 58 may be provided in the pilot line 52 to prevent back-pressure from building up in the pilot line. When such an orifice is used it is desirable to provide a by-pass line 60 around the orifice with a check valve 62 in the by-pass line so as to permit rapid shifting of the pilot valve 50 to move valve 48 from blocking position when the line 46 is put on exhaust.

While one embodiment of my invention has been shown and described, it will be apparent that other adaptations and modifications may be made without departing from the scope of the following claim.

I claim:

In a test head for hydrostatic pipe-testing apparatus including a generally cylindrical body having a central bore open at one end and adapted to receive an end of a length of pipe, power means for causing axial movement of said body, and a valve controlling said power means, the combination therewith of a valve cylinder in said body axially aligned with said bore and communicating therewith, a valve piston reciprocable in said cylinder and extending therefrom into said bore whereby the piston is engaged by said end of a pipe length upon predetermined movement of said end of a pipe length relative to said body, and means controlled by the position of said piston for actuating said valve controlling said power means.

References Cited in the file of this patent

UNITED STATES PATENTS 2,707,876    McConnell et al. _____ May 10, 1955